United States Patent [19]

Zhou

[11] Patent Number: 5,583,934
[45] Date of Patent: Dec. 10, 1996

[54] DC LEVEL CONTROL FOR AN ELECTRONIC TELEPHONE LINE CARD

[75] Inventor: Yan Zhou, Austin, Tex.

[73] Assignee: Advanced Micro Devices, Inc., Sunnyvale, Calif.

[21] Appl. No.: 398,295

[22] Filed: Mar. 3, 1995

[51] Int. Cl.$^6$ ............................................. H03M 1/06
[52] U.S. Cl. .................... 379/399; 379/361; 379/385; 379/283; 379/282; 375/317; 327/77
[58] Field of Search ............................ 379/283, 282, 379/280, 385, 377, 399, 361; 375/317; 327/77

[56] References Cited

U.S. PATENT DOCUMENTS

| | | | |
|---|---|---|---|
| 4,065,726 | 12/1977 | Senger | 330/288 |
| 4,410,876 | 10/1983 | Sawagata | 340/347 CC |
| 4,602,374 | 7/1986 | Nakamura et al. | 340/347 AD |
| 4,766,417 | 8/1988 | Takayama et al. | 340/347 CC |
| 4,860,010 | 8/1989 | Iwamatsu | 341/118 |
| 5,027,389 | 6/1991 | Chiue et al. | 379/361 |

FOREIGN PATENT DOCUMENTS

363185256  7/1988  Japan ............................ 375/317

*Primary Examiner*—Krista M. Zele
*Assistant Examiner*—Gloria Tebcherani
*Attorney, Agent, or Firm*—Stanford & Bennett LLP; Gary R. Stanford

[57] ABSTRACT

DC level control for an electronic telephone line card which filters the DC component from the input audio signal, determines the gain setting of the transmit path, develops a DC adjust voltage opposite to that of the DC shift component and subtracts the DC adjust voltage to the input voltage to cancel the DC shift component. A quantized, discontinuous feedback path is implemented to respond only to DC shifts so the AC operation remains substantially unaffected. Such discontinuous feedback eliminates stability and impedance matching problems introduced with continuous feedback solutions. A DC control circuit according to the present invention includes a low pass filter for detecting DC shifts, a quantizer for asserting an incremental signal, a threshold detector for activating adjustment functions, and an accumulator for developing the DC adjust voltage by incremental steps. A long term low pass filter and reset circuit resets the accumulator to cancel residual DC adjust voltages which might otherwise reduce the dynamic range of the telephone line transmit path.

24 Claims, 5 Drawing Sheets

DC LEVEL CONTROL FOR AN ELECTRONIC TELEPHONE LINE CARD

FIELD OF THE INVENTION

The present invention relates to DC level control on a telephone line card, and more particularly to a system and method for controlling sudden DC voltage level shifts due to impedance changes typically caused by a dual-tone multi-frequency (DTMF) generator.

DESCRIPTION OF THE RELATED ART

An electronic telephone line card provides interfacing between a two-wire connection of an individual telephone line, conventionally referred to as the "tip" and "ring" signals, to end office switches, otherwise referred to as a subscriber loop interface. An analog telephone functions as a switch designed to interconnect a bi-directional loop or two-wire interface. Digital subscriber loops using digital processing techniques require separation between the transmit and receive paths, resulting in what is known as a four-wire interface having two separate directions of transmission. The telephone line card thus performs hybrid functions for separating the bi-directional two-wire interface to the four-wire interface. The ultimate transmission path to remote locations or offices is often referred to as the PCM (pulse code modulation) highway. Thus, a central office would include a plurality of telephone line cards for interfacing a plurality of local analog telephones to the PCM highway.

The line card architecture typically includes an electronic SLIC (subscriber line interface circuit) for performing what is commonly referred to as the BORSCHT functions, which includes Battery feed, Overvoltage protection, Ringing, Supervision, Hybrid and Test functions. SLIC devices from Advanced Micro Devices, Inc. have additional features such as current limiting, on-hook transmission, polarity reversal, tip open, and loop current detection. The SLIC device is typically coupled to a SLAC (subscriber line audio-processing circuit), which handles analog to digital and digital to analog signal conversion, filtering, compression and expansion functions required to interface the analog voice signal from a telephone to the digital PCM highway.

A push-button analog telephone typically includes a DTMF (dual-tone multifrequency) generator for generating the tones necessary for dialing. Each time the user presses a dial button, the telephone switches from the voice speaker and microphone to the DTMF generator, which does not have the same impedance as the voice speaker and microphone path. The DTMF generator causes an impedance change on the two-wire interface thereby generating a sudden DC level shift. Telephones manufactured in the U.S. have relatively strict standards for the maximum allowed impedance change due to such switching, such as 50 ohms ($\Omega$) or less. However, telephones manufactured elsewhere and even certain facsimile machines are not subject to these standards, so that an impedance change on the order of about 200 $\Omega$ or more is not uncommon.

The impedance change caused by the DTMF generator causes a DC level shift between several volts to ten volts or more depending upon the loop current. The SLIC and SLAC devices are typically five volt digital components with a maximum peak to peak operating voltage of less than five volts, thus having practical maximum voltage swings of 2.2 V or less. The sudden DC level shift causes one or more components within the SLIC and SLAC devices to saturate for a significant period of time, such as greater than 80 milliseconds (ms). However, less than 20 ms of interruption time is required for DTMF detection, so that such saturation of the electronic components interferes with normal DTMF signal detection. Such non-detection of the DTMF signal is not acceptable and will result in erroneous operation of the telephone.

It is therefore desirable to detect and remove sudden DC voltage shifts without impacting the AC performance at any frequency band of the telephone line card. Further, it is desired to provide a solution that is relatively easy to implement and cost effective.

SUMMARY OF THE INVENTION

DC level control for an electronic telephone line card according to the present invention filters out the DC component from the audio signal, determines the gain setting in the transmit path, develops a DC adjust voltage opposite to that of the DC shift component and adds the developed DC voltage to the input of the two-wire interface amplifier. In this manner, a sudden DC level shift resulting from a sudden impedance change is subtracted out within the desired interruption time specification to enable DTMF detection. The present invention utilizes a quantized, discontinuous filter block so that the DC level correction is conditionally introduced by a feedback loop only long enough to adjust the sudden DC shift. Further, the feedback loop is only responsive to DC voltages so that even low frequencies are not fed back to the input. The feedback loop is effectively transparent and does not affect AC circuit operation. In this manner, stability, oscillation and impedance matching problems are entirely avoided. Further, a separate long term low pass filter detects any DC residue generated by the adjustment circuit, and a reset circuit cancels the DC residue to retrieve full dynamic range.

In the SLAC portion, a low pass filter (LPF) is provided for quickly responding to sudden DC voltage changes of the audio signal, where the response is preferably less than 5 ms or well within the maximum desired interruption time. The LPF provides a shift voltage to an adjust circuit which provides a quantized incremental voltage signal while the shift signal is above a predetermined level. Within the adjust circuit, a duplicate gain amplifier having the same gain as the transmitter path gain amplifier receives the shift voltage output of the LPF to monitor the DC level and to amplify very low signals. The output of the duplicate gain amplifier is provided to a threshold detector for activating a switch circuit when the output of the amplifier is above a predetermined threshold level. The predetermined threshold level is preferably half the maximum voltage magnitude of the duplicate amplifier which ensures that the complete transmit channel remains unsaturated.

The output of the LPF is also provided to a quantizer within the adjust circuit, which has a resolution based on the range of the transmitter gain. The quantizer outputs a positive or negative quantized signal when the magnitude of its input voltage is above a quantization level, but otherwise outputs a zero voltage. The output of the quantizer is provided by the switch circuit to an accumulator, which digitally ramps up while the switch circuit is activated. In particular, the accumulator ramps up by the quantization amount until approximately equivalent to the undesired DC voltage shift. The output of the accumulator is converted to an analog voltage and is then subtracted at the input of the SLIC metallic voltage amplifier to cancel the DC voltage shift. In this manner, while the output of the duplicate gain amplifier is above the predetermined threshold, a DC adjust voltage is added to the input amplifier to offset the initial DC voltage shift introduced by the DTMF generator. When the DC shift voltage source is removed, i.e., when the user is finishing dialing a digit, the output of the duplicate gain amplifier reverses polarity, causing the accumulator to ramp back down to remove the DC adjust voltage.

In certain circumstances, the output of the accumulator may not go to zero but instead may supply a residual voltage. This might occur, for example, when the input audio signal itself has a small DC offset less than the quantized resolution. This voltage residue would otherwise be amplified in the transmit path and decrease the dynamic range of the audio signal. To ensure that the dynamic range of voice operation is maintained, a detection circuit is provided to detect this offset error and reset the accumulator. In particular, a long term LPF is provided to detect and output a voltage equal to any DC residue generated by the accumulator itself. A reset circuit monitors the accumulator output, the output of the threshold detector and the long term LPF and resets the accumulator when the output of the duplicate gain amplifier is within its threshold voltage, when the output of the accumulator is not zero, and when the difference between the outputs of the accumulator and the long term LPF is less than or equal to the resolution voltage of the accumulator.

In this manner, DC voltage level control according to the present invention eliminates the effect of sudden DC voltage shifts within the requisite maximum interruption time period to pull telephone line card components out of saturation in time for DTMF signal detection. This correction is performed without impacting the AC performance in any frequency band of the telephone line card. Further, an implementation of the present invention is easily achieved at a relatively low cost.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
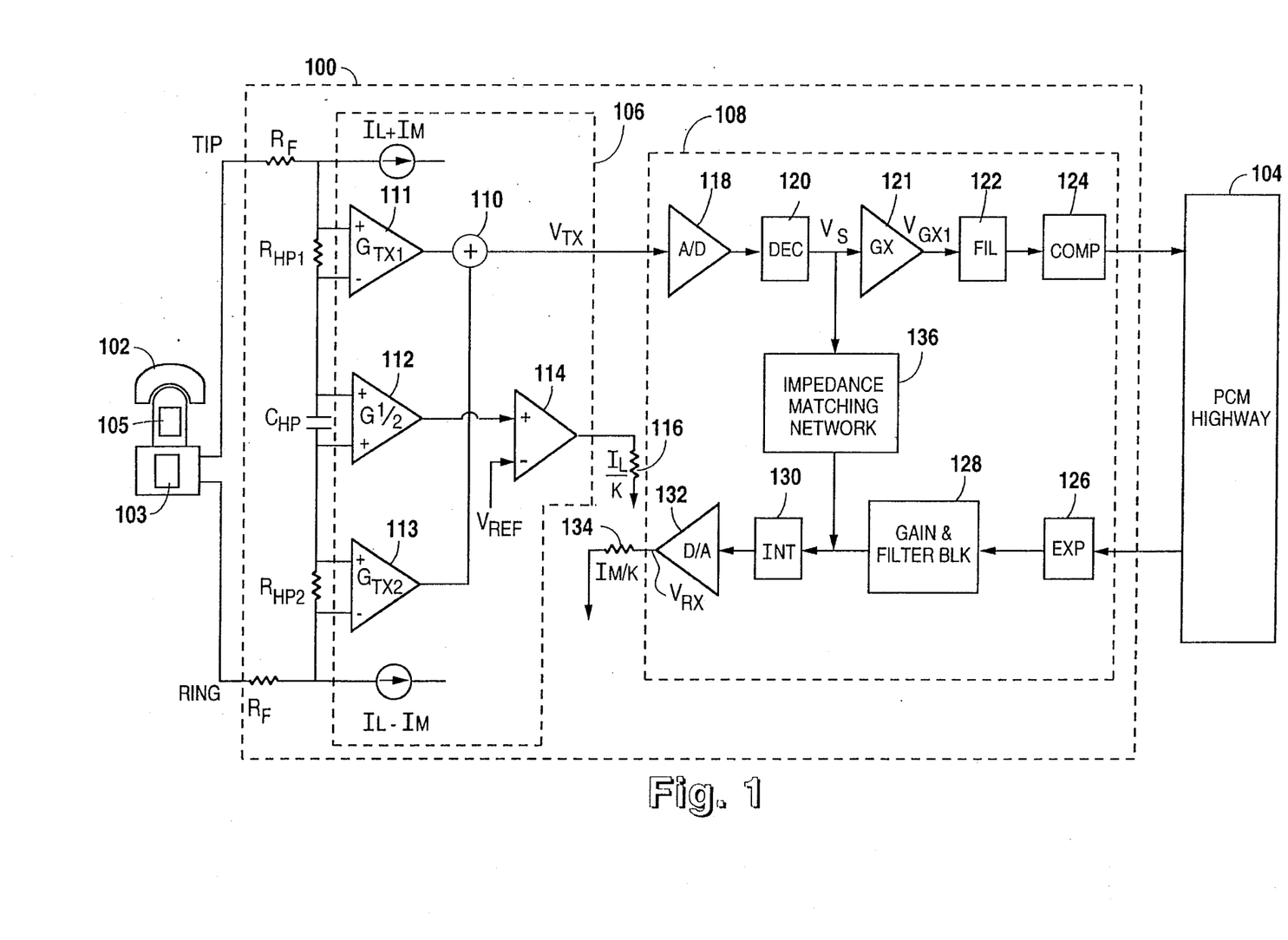
FIG. 1 is a block diagram of a telephone line card for interfacing an analog telephone to a PCM highway.

Referring now to FIG. 1, a block diagram is shown of a telephone line card 100 for interfacing an analog telephone 102 to a pulse code modulation (PCM) highway 104. The telephone 102 includes a standard dial pad 105 with buttons for purposes of dialing as generally known. The telephone line card 100 includes a SLIC 106 for performing a variety of functions, such as battery feed, overload protection, polarity reversal, on-hook transmission, switching regulation and current limiting. The telephone line card 100 also includes a SLAC 108 for handling analog-to-digital (A/D) and digital-to-analog (D/A) signal conversion, filtering, and interfacing with the pulse code modulation (PCM) highway 104. The SLAC 108 also allows a user to program a desirable input impedance for the line card 100, as described below.

The SLIC 106 is connected to the telephone 102 via a two-wire connection, which includes two conductors for carrying "TIP" and "RING" signals, respectively, as known to those skilled in the art. The SLIC 106 includes current mode amplifiers (not shown) for developing a current $I_L+I_M$ through a series resistor $R_F$ on the TIP conductor and for developing a current $I_L-I_M$ through another series resistor $R_F$ on the RING conductor as shown. The $I_L$ current is the longitudinal or common mode current and $I_M$ is the metallic or differential current between the TIP and RING signals. In general, $I_L$ represents the DC current component and $I_M$ represents the AC current component for carrying the audio voice signals between the telephone 102 and the line card 100.

Figure 4:
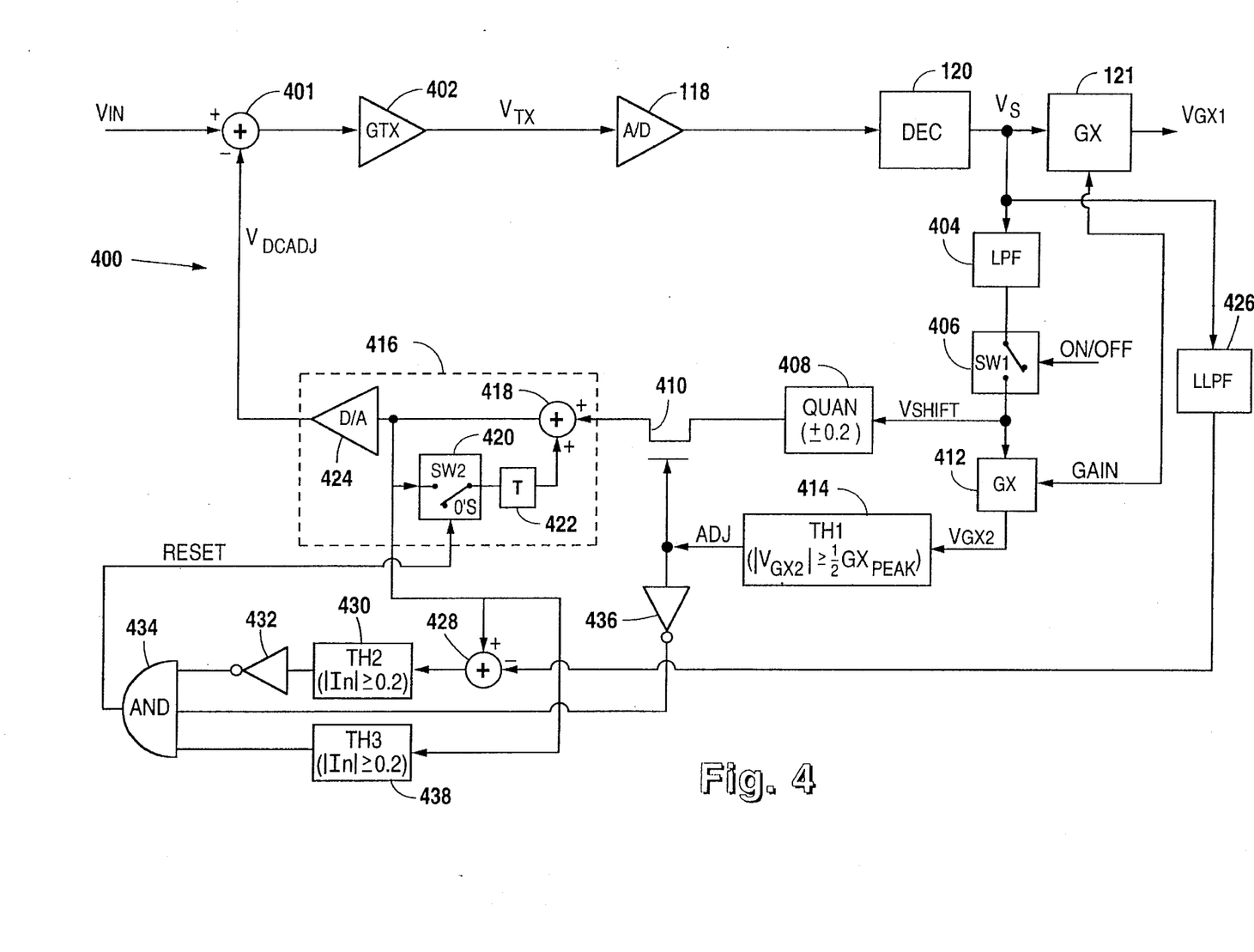
FIG. 4 is a block diagram of a DC level shift control circuit for performing DC level control according to the present invention.

Two resistors $R_{HP1}$ and $R_{HP2}$ and a capacitor $C_{HP}$ are placed in series between the TIP and RING signals for separating the metallic and longitudinal signals. A first differential amplifier 111 having a gain $G_{TX1}$ has its inputs connected across the resistor $R_{HP1}$ and a second differential amplifier 113 having a gain $G_{TX2}$ has its inputs connected across the resistor $R_{HP2}$. The $G_{TX1}$ and $G_{TX2}$ amplifiers 111, 113 collectively detect the AC metallic voltage component measured across the $R_{HP1}$ and $R_{HP2}$ resistors, respectively, and preferably have gains of equal amplitude but opposite polarity for detecting the positive and negative portion of the AC component. The $R_{HP1}$, $R_{HP2}$ resistors are collectively referred to as a series resistor $R_{HP}$, which is typically about 400–500 KΩ. The outputs of the $G_{TX1}$ and $G_{TX2}$ amplifiers 111, 113 are summed together at a summing junction 110, for providing an analog audio voltage $V_{TX}$ at the four-wire output of the SLIC 106. For purposes of the present invention, the collective voltage across the series resistor $R_{HP}$ is referred to as the input signal $V_{IN}$ from the telephone 102, which is provided to the $G_{TX}$ amplifier 402 for developing the $V_{TX}$ signal, as shown in FIG. 4.

The SLIC 106 also includes a third amplifier 112 having its inputs connected across the capacitor $C_{HP}$, which separates the DC component of the input signal to the SLIC 106. It is noted that the combination of the series resistor $R_{HP}$, the capacitor $C_{HP}$ and the amplifier 112 function as a very low pass filter, which prevents the AC speech signals from entering the internal DC loop of the SLIC 106. The capacitor $C_{HP}$ sets the low frequency limit of the voice band response, where a typical value of 0.33 μF is used for optimizing voice band and DC loop performance. This low pass filter has a cutoff frequency of about 2 Hz or less.

The output of the amplifier 112 is connected to the non-inverting input terminal of another amplifier 114, which receives a reference voltage $V_{REF}$ at its inverting input terminal. The output of the amplifier 114 is provided across a load impedance 116, where the amplifier 114 develops a current $I_L/K$ across the load 116. K is a constant representing the internal current mode amplifier gain of the SLIC 106. The $V_{REF}$ signal is a bias voltage established by a longitudinal control loop for biasing the internal current mode SLIC amplifiers to operate in their linear region, i.e., for controlling the longitudinal line current to obtain an optimal common mode DC operating point for the current mode amplifiers.

The output $V_{TX}$ of the adder 110 is connected to the input of an A/D converter 118 within the SLAC 108. The A/D converter 118 provides digital signals to a decimator 120. It is noted that the A/D converter 118 has a very high sampling rate, such as 4 megahertz (MHz), and preferably provides digital values having 6 bits, although other bit sizes are possible. The decimator 120 reduces the sampling rate to approximately 8 kHz, and its output is provided to a transmitter path amplifier 121 having a gain GX, which is typically programmable within a range of 0–12 decibels (dB). The output of the GX amplifier 121 is provided to the input of a filter block 122. The output of the filter block 122 is provided to the input of a compression unit 124, which provides PCM codes to the transmit input of the PCM highway 104. The PCM highway 104 provides PCM codes received from remote devices to an expansion unit 126 within the SLAC 108. The digital data provided from the expansion unit 126 is provided to the input of a gain and filter block 128, which provides its output to an interpolator 130, which increases the sampling rate for conversion to analog. The output of the interpolator 130 is provided to a D/A converter 132, which converts filtered and interpolated digital data into an analog output signal referred to as $V_{RX}$, which is the receive signal of the analog four-wire interface between the SLIC 106 and the SLAC 108. The $V_{RX}$ signal is shown provided across an impedance 134 for developing a current $I_M/K$ into the receive summary node (RSN), not shown, of the SLIC 106 for controlling the metallic current of the two-wire interface.

An impedance matching network 136 is connected between the transmit and receive paths within the SLAC 108, where the impedance matching network 136 is typically connected to portions of the decimator 120 and the interpolator 130. The impedance matching network 136 is programmable to allow a user to modify the effective termination impedance of the SLIC 106 to a desired value. This is generally used to match the two-wire impedance between the telephone 102 and the SLIC device 106 to allow maximum power transfer and minimize echoes during normal operation. The impedance matching network 136, however, is insufficient to prevent saturation of electronic components due to sudden DC shifts caused by the DTMF generator 103.

The keypad 105 on the telephone 102 enables a user to dial a number, where the telephone 102 switches from the speaker/microphone to connect the DTMF generator 103 to assert corresponding dialing tones onto the TIP/RING two-wire interface. The DTMF generator 103 has a different impedance than the speaker/microphone, where these impedances can differ by 50–200 Ω or more. Since the loop current may range from 25–45 mA, such switching results in a sudden DC level shift on the two-wire interface. The sudden DC voltage ranges from a few volts up to ten volts or more, thereby violating the maximum voltage range of the SLIC 106 and the SLAC 108, which operate in the range of 0–5 V. The series resistor $R_{HP}$ and the capacitor $C_{HP}$ have a relatively large RC time constant, typically on the order of 100–150 ms, causing saturation of the $G_{TX1}$ and $G_{TX1}$ amplifiers 111, 113 (or the $G_{TX}$ amplifier 402), the A/D converter 118, the decimator 120 and the GX amplifier 121 for at least 80 ms or more.

Figure 2:
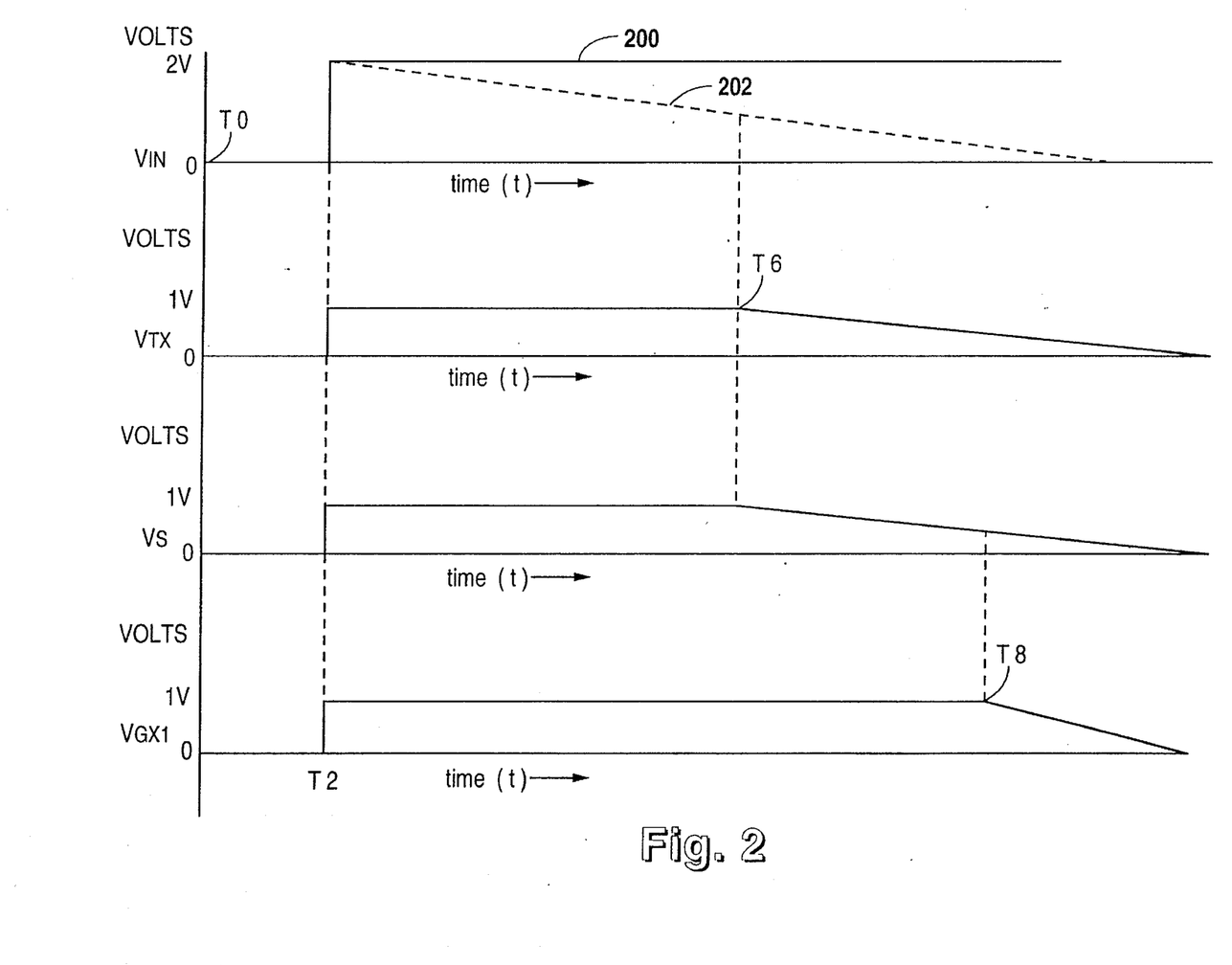
FIG. 2 is a timing diagram illustrating the effect of a DC voltage shift causing saturation of components of the line card of FIG. 1.

FIG. 2 is a timing diagram illustrating the saturation situation of the telephone line card 100 operating without the benefit of the present invention. The output of the decimator 120 is a digital value but is shown analog form as a voltage signal $V_S$, which generally follows the $V_{TX}$ signal. The output of the GX amplifier 121 is shown as a signal $V_{GX1}$.

The curves are plots of voltage versus time for the $V_{IN}$, $V_{TX}$, $V_S$ and $V_{GX1}$ signals. For purposes of simplicity and clarity, the voltage levels for both the SLIC 106 and the SLAC 108 are normalized, so that the saturation level for the internal components is 1 volt. The $V_{IN}$ signal is also normalized to a comparable voltage level relative to the normalized voltage levels of the telephone line card 100. Such normalization is made to clarify operation and is not meant to limit the present invention. Although, maximum voltage swings of 2.2 V are possible with five volt devices, such swings are generally limited in practice to 1.5 volt swings for a maximum peak to peak voltage of 3 V due to semiconductor junction voltage drop in diodes, transistors, etc. Thus, normalization to 1 volt swings and 2 volt peak to peak is close to the practical limits of 5 volt devices.

All voltages are initially zero at time T0. At time T2, the user presses a button on the keypad 105 and the DTMF 103 causes a 2 volt (2 V) DC voltage shift (normalized) of the $V_{IN}$ signal as shown in FIG. 2. Normally, a person holds a key for dialing for more than 200 ms, as shown by curve 200. The $G_{TX}$ amplifier 402 almost immediately saturates to 1 V in response, as shown by the $V_{TX}$ signal. The voltage across the capacitor $C_{HP}$ begins to decay as shown by curve 202. Although the voltage decay is exponential, it is shown as a linear decay for purposes of illustration since the time constant is relatively long. Thus, due to the relatively long RC time constant of the resistor $R_{HP}$ and the capacitor $C_{HP}$, the $G_{TX}$ amplifier 402 remains saturated and its voltage does not decay to one volt until at least 80 ms or more at a time T6. Assuming the gain GX of the amplifier 121 is approximately 6 dB so that it effectively doubles its input voltage, the GX amplifier 121 is saturated even longer to a time T8, which is a at least 150 to 200 ms after time T2. This significantly large saturation period results in a "no detection" situation, since an interruption time of 20 ms or less is required for DTMF detection. This "no detection" situation is undesirable, since the DTMF is not detected by the line card 100 within the required specification of 20 ms or less, causing incorrect operation of the telephone system.

Several solutions have been contemplated for reducing or otherwise eliminating the saturation caused by sudden DC level shifts. For example, a high pass filter network could be placed between the SLIC 106 and SLAC 108 to reject DC voltages and to prevent the SLAC 108 from saturating. The impedance of the line card 100, however, would be altered by the high pass filter and it would be difficult to compensate for such an impedance change. This is true even using the impedance matching network 136 since it comprises a digital filter with a relatively high sampling rate, which therefore exhibits cycle limit problems. The high pass filter would require relatively accurate components to sufficiently reduce variations from one line card to the next, where such variations would otherwise impact the two-wire interface return loss performance. Thus, expensive components would be required, such as a 5% or higher accuracy capacitor, which would impose a substantially expensive solution.

Figure 3:
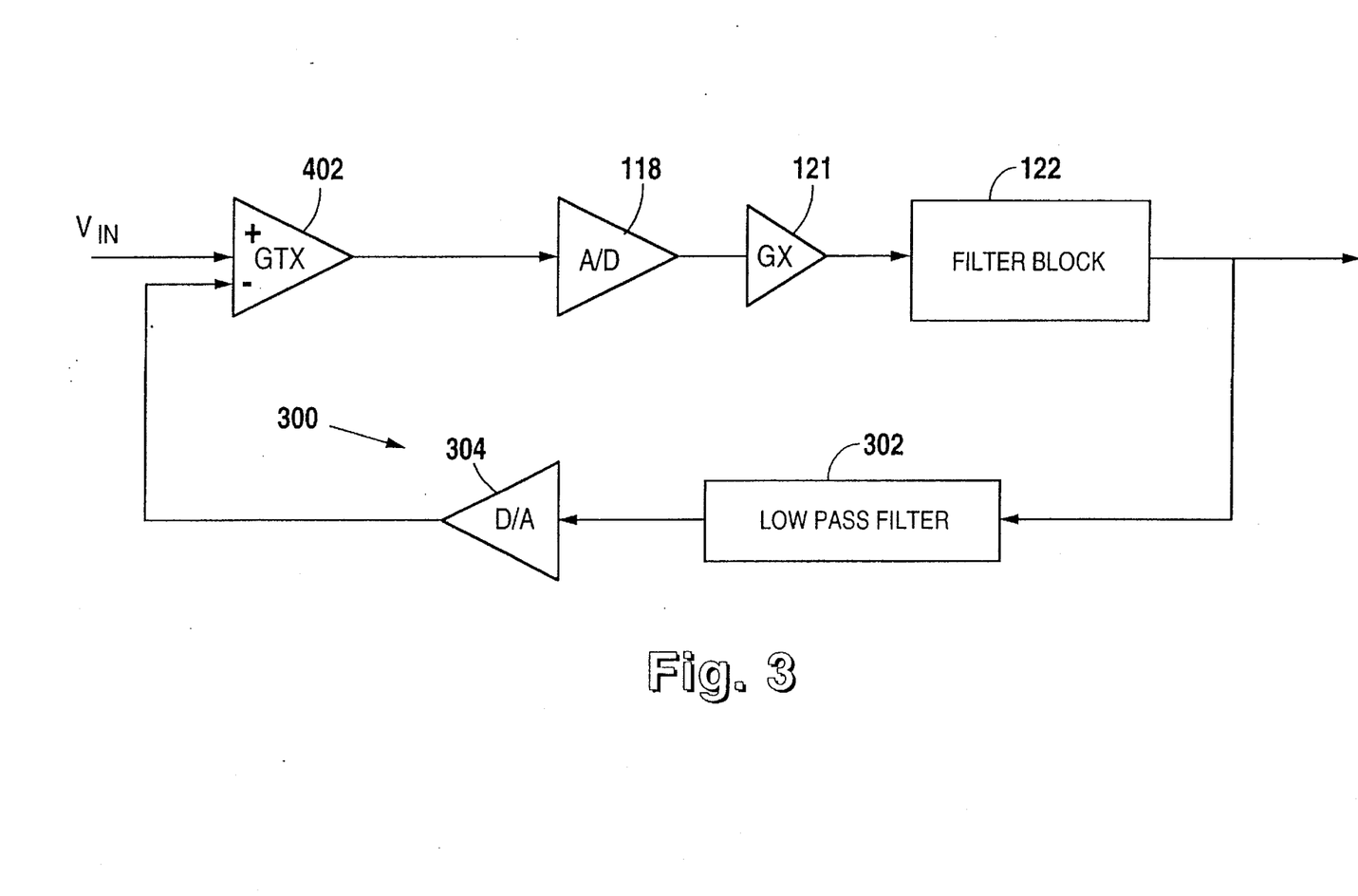
FIG. 3 is a block diagram of a continuous feedback DC cancelling network.

A continuous DC voltage cancelling network 300 is also contemplated, as shown in FIG. 3. In particular, an LPF 302 and a D/A converter 304 are coupled in series between the filter block 122 and the input of the $G_{TX}$ amplifier 402. However, this solution would also substantially impact the two-wire return loss, especially in the low frequency band. The loop and system stability would have to be monitored and compensated since a continuous feedback loop is implemented. Such continuous feedback loops may cause instability, oscillation and impedance matching problems that would have to be addressed. Such solutions are possible though undesirable from design and cost standpoints.

Referring now to FIG. 4, a block diagram is shown of a DC level shift control circuit 400 according to the present invention as connected to components of the SLIC 106 and SLAC 108. The DC level shift control circuit 400 filters out the DC components from the input audio signal, determines the gain setting in the transmit path using a duplicate gain amplifier, and introduces a DC adjust voltage which is opposite to the input DC level shift to avoid extended saturation. A summing junction subtracts the DC adjust voltage from the input voltage to counteract the DC shift. A long term filter is also included to correct for any DC residue caused by the DC level shift control circuit 400, as described below.

An adder 401 receives the $V_{IN}$ signal from the telephone line pair (not shown) on one of its two inputs, and subtracts a DC adjust feedback signal, referred to as $V_{DCADJ}$, received at its other input from the $V_{IN}$ signal. This difference signal is provided to the $G_{TX}$ amplifier 402 for developing the $V_{TX}$ signal. It is noted that the term "adder" generally refers to a summing junction for arithmetically combining two or more signals, such as through addition or subtraction. The adder 401 may be implemented in any appropriate manner, such as using resistive summing junctions and a differential amplifier, etc. For convenience, the other components of the SLIC 106 as shown in FIG. 1 are not included in FIG. 4.

A portion of the transmit path within the SLAC 108 is repeated, including the A/D converter 118, the decimator 120 and the GX amplifier 121. The $V_S$ signal output of the decimator 120 is connected to the input of a low pass filter (LPF) 404, having its output connected to the input of a digital switch 406. The switch 406 is used to enable or disable DC level shift control according to the present invention, so that when the switch 406 is in the open state, the DC level shift control circuit 400 is disconnected and DC level control according to the present invention is not performed. It will be assumed, however, that the switch 406 is closed for enabling the DC level shift control circuit 400.

The output of the LPF 404 is coupled to the input of an amplifier 412 having the same gain GX as the GX amplifier 121. Preferably, the GX amplifiers 121 and 412 are both programmable and are programmed to always have the same gain. The output of the GX amplifier 412 is provided to a threshold detection circuit TH1 414, which has a voltage threshold level preferably set to one-half the peak output voltage of the GX amplifier 412. The TH1 414 asserts its binary output high, i.e., 5 V or logic 1, if the output voltage of the GX amplifier 412, referred to as a signal $V_{GX2}$, is greater than or equal to half of its positive peak voltage value, or less than or equal to half of its negative peak value but otherwise the TH1 414 asserts its output low, i.e., 0 V or logic 0. In the preferred embodiment, the peak voltages of $V_{GX2}$ is ±1 volt. The output of the LPF 404 is also coupled to the input of a quantizer (QUAN) 408, which also provides a quantized voltage signal at its output depending upon the voltage level at the output of the LPF (404). In particular, the quantizer 408 asserts a digital output value equivalent to +0.2 V if the output of the LPF 404 is greater than or equal to 0.2 V and outputs a digital value equivalent to −0.2 V if the output of the LPF 404 is less than or equal to −0.2 V. If the output of the LPF 404 is between −0.2 and +0.2 V, the output of the quantizer 408 is zero. In this manner, the resolution of the quantizer 408 is 0.2 V.

It is noted that the resolution of the quantizer 408 is based upon the gain GX of the GX amplifier 121 when having a normalized maximum desired swing of 1 V, or 2 V peak to peak. In particular, a voltage of 0.2 V is amplified by four to 0.8 V at an amplification of 12 dB, where 0.8 V is below the saturation point. The next 0.2 increment causes amplification above 1 volt, and thus into saturation. A higher gain range would require a finer quantizer resolution, which would mean a smaller voltage increment. It is also noted that a 0.2 V quantizer step allows an inexpensive implementation. However, the quantizer resolution may be modified depending upon several factors, such as the maximum voltage swings of the SLIC and SLAC components and the maximum gain of the GX amplifiers 121, 412. Such variations are a matter of design choice.

The output of the quantizer 408 is connected to the input or source of a switch circuit 410, shown as a field effect transistor (FET). It is noted that a plurality of parallel FET switches are preferably incorporated for each bit, although a single FET is shown for clarity. The output of the TH1 414, referred to as a binary signal ADJ, is provided to the control terminal or gate of the FET 410, where the TH1 414 turns the FET 410 either on or off depending upon the whether its threshold voltage level is exceeded or not. The drain of the FET 410 is connected to one input of an adder junction 418 within an accumulator 416, where the adder 418 receives the output of a time delay 422 at its other input. The output of the adder 418 is provided to the input of a D/A converter 424, and to one input terminal of a double pole, single throw switch device 420, which has its output terminal connected to the input of the time delay 422. The other input pole of the switch 420 is connected to ground or logic zero. Again, a plurality of binary switches are used to implement the switch 420 although only one is shown. The time delay 422 provides an output value equal to its input value after a predetermined time delay, which is preferably approximately 0.5 ms in the preferred embodiment. The switch 420 is controlled by a binary signal RESET, where the switch 420 connects the output of the adder 418 to the input of the time delay 422 when the RESET signal is negated or low, but otherwise connects logic zero to the input of the time delay 422 when the RESET signal is asserted or high. In this manner, the RESET signal and the switch 420 are used to reset the accumulator 416 under certain conditions, as will be described in more detail below.

The accumulator 416 functions to sum an accumulated value with an incremental or quantized value from the quantizer 408 after the time delay determining the time delay 422, where the incremental value is preferably 0.2 V. Thus, the output of the adder 418 either ramps up or down while the switches 410 and 420 are turned on, or stays at a steady DC value if the switch 410 is turned off. The accumulator 416 outputs 0 V while the RESET signal is asserted. The digital voltage ramp has a relatively fast slope compared with the SLIC 106 since the time delay is chosen below 1 ms. The D/A converter 424 converts the digital value from the adder 418 to an analog voltage. The output of the D/A converter 424 provides the $V_{DCADJ}$ signal, which is subtracted from the $V_{IN}$ signal by the adder 401. In this manner, the $V_{DCADJ}$ signal offsets DC voltage shifts on the $V_{IN}$ signal as further described below.

The output of the TH1 414 is connected to an inverter 436, having its output connected to one input of a three-input AND logic gate 434. A long term DC level predictor and very narrow band filter (LLPF) 426 receives the $V_S$ signal from the decimator 120 and has its output connected to one input of an adder 428. The output of the adder 418 is provided to the other input of the adder 428, so that the output of the LLPF 426 is added to the output of the adder 418. The output value of the adder 428 is provided to the input of a second threshold detection circuit TH2 430, which has its output connected to the input of an inverter 432. The output of the inverter 432 is connected to a second input of the AND gate 434. The TH2 430 asserts its output low if its input voltage is between −0.2 V and 0.2 V, but otherwise asserts its output high if the absolute value of its input voltage is greater than or equal to 0.2 V. The output of the adder 418 is also connected to a third threshold detection circuit TH3 438, which is similar in its function to the TH2 430. The output of the TH3 438 is connected to a third input of the AND gate 434. The AND gate 434 asserts the RESET signal to reset the accumulator 416 under certain conditions, described below.

The operation of the DC level shift control circuit will be explained with reference to FIG. 4. The LPF 404 according to the preferred embodiment has a cut-off frequency of approximately 40 Hz and a sampling rate of 8 kHz, where the LPF 404 has a transfer function as given by the following equation 1:

$$H(z) = \frac{0.03125}{1 - 0.96875z^{-1}} \quad (1)$$

In this manner, the LPF 404 responds to a DC level shift of the audio signal in 4 ms or less. The LPF 404 filters out desired voice frequencies (preferably between 200 Hz–3.4 kHz) and preserves the DC level, so that it determines if any sudden DC level shift has occurred on the input signal $V_{IN}$. Of course, other cut-off frequencies, sampling rates, and transfer functions for the LPF 404 can be utilized as is known to one of ordinary skill in the art, and still keeping within the teachings of the invention.

The GX amplifier 412 is provided to duplicated or otherwise represent the GX amplifier 121, where they both have the same gain GX. It is desired to monitor the DC level after the GX amplifier 121 to ensure proper operation of the DC level shift control circuit 400 according to the invention. For example, a 0.3 V DC shift sensed at the A/D converter 118 can cause the transmit path to almost saturate if the gain GX is set to 12 dB (decibels). The quantizer 408 receives a continuous input level from the LPF 404 and outputs a quantized level.

The FET 410 is used to stop the accumulator 416 from ramping up or down. The FET 410 is activated by the TH1 414 while the absolute value of the $V_{GX1}$ signal is greater than or equal to 0.5 V. When the FET 410 is off, the ADJ signal pulls the gate and drain of the FET 410 low, thereby providing zero voltage to the adder 418. Also, the accumulator 416 provides a constant DC voltage. While the FET 410 is activated, the adder 418 adds the output of the quantizer 408 to the delayed output of the time delay 422, so that the adder 418 ramps up or down by the quantizer step level. The output signal of the adder 418 is converted to the analog signal $V_{DCADJ}$ by the D/A converter 424 and subtracted from the $V_{IN}$ signal by the adder 401 to counteract DC voltage shifts. When the source of the DC shift disappears, the voltage of the $V_{DCADJ}$ signal causes the opposite problem in that it now represents an undesirable voltage shift in the opposite direction. However, the DC level shift control circuit 400 corrects this in a similar manner, where this voltage is detected by the LPF 404 and amplified by the GX amplifier 412 causing the accumulator 416 to ramp back down to approximately zero.

In the preferred embodiment, the LLPF 426 has a 2 Hz cutoff frequency operates at a 250 Hz sampling frequency and has a transfer function according to the following equation 2:

$$H(z) = \frac{1}{256} \left( \frac{1}{1 - 1.941406z^{-1} + 0.941406z^{-1}} \right) \left( \frac{1}{32} \right) \sum_{i=0}^{31} z^{-i} \quad (2)$$

Of course, the LLPF 426 can have a different cutoff frequency, sampling frequency, and/or transfer function and still be within the scope of the invention as described herein. The LLPF 426 is desired so that an instantaneous DC level shift, such as a narrow voltage spike, will not confuse the decision-making process of the DC level shift control circuit 400.

The switch 420 is needed to clear the DC residue (i.e., DC level<minimum threshold) during normal operation of the telephone line card 100. If the DC residue is not cleared during a normal telephone call, the dynamic range of the voice channel will be substantially reduced, which is an undesirable condition. In certain circumstances, for example, the output of the accumulator 416 may not go to zero but instead may supply a residue voltage equivalent to its voltage resolution of 0.2 V. This might occur when the $V_{IN}$ signal itself has a small DC offset less than this voltage resolution. This voltage residue would otherwise be amplified by the GX amplifier 121 in the transmit path and decrease the dynamic range of the audio signal. The LLPF 426 is also used to detect this voltage residue and output a voltage equal to any DC residue generated by the accumulator 416 itself. The AND gate 434 asserts the RESET signal to reset the accumulator 416 when the output of the GX amplifier 412 is within its threshold voltage, when the output of the accumulator 416 is not zero, and when the sum of the outputs of the adder 418 and the LLPF 426 is less than or equal to the resolution voltage of the accumulator 416.

The threshold setting for the TH1 414 should be set high enough so that an alternating input signal, such as a 200 Hz sinewave, does not trigger the DC level shift control circuit. However, setting the threshold too high may cause the transmit DC level to become very high, which is also undesirable. In that case, some of the signal may start to clip after being output from the GX amplifier 121. Therefore, a good choice of the threshold level for the first threshold detection circuit TH1 414 is approximately one-half of the saturation voltage of the GX amplifier 121 (and 412). Most of the voice signal with frequency greater than 100 Hz has already been partially filtered by the LPF 404, so that the TH1 414 primarily receives a DC signal. The feedback concept according to the preferred embodiment is not continuous, but rather utilizes a quantized, discontinuous filter block. Therefore, the stability problems associated with conventional methods for handling DC level shifts are not present in the system according to the invention.

Figure 5:
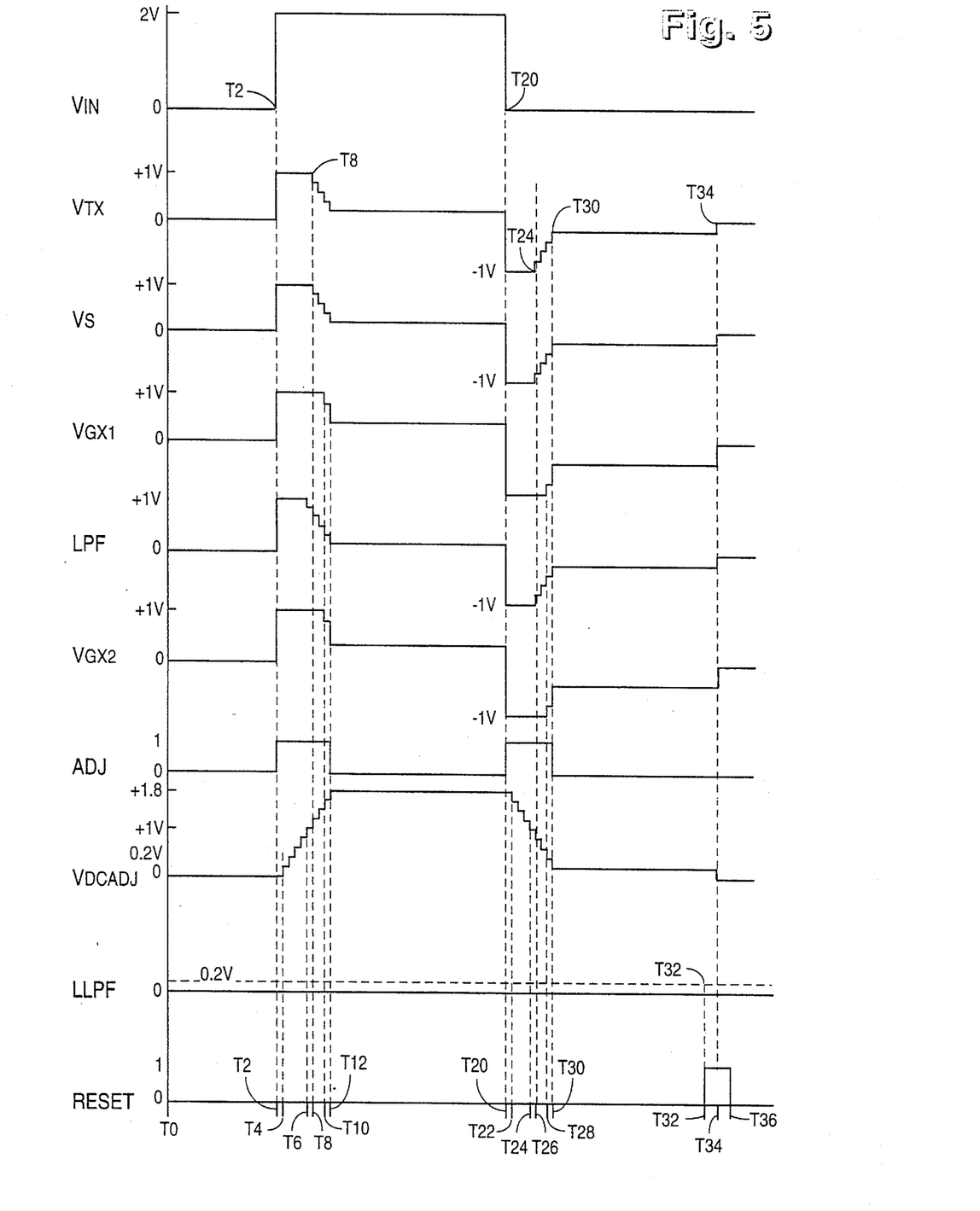
FIG. 5 is a timing diagram illustrating the operation of the DC level shift control circuit of FIG. 4.

Referring now to FIG. 5, a timing diagram is shown to illustrate operation of the DC level shift control circuit 400 according to the present invention. The $V_{IN}$ signal, the $V_{TX}$ signal, the $V_S$ signal, the $V_{GX1}$ signal, the output of the LPF 404 (shown as LPF), the $V_{GX2}$ signal, the ADJ signal, the $V_{DCADJ}$ signal, the output of the LLPF 426 (shown as LLPF) and the RESET signal as output by the AND gate 434 are shown plotted versus time. For clarity, any voice signals are ignored, so that only the response to a DC step voltage is shown. In this example, the worst case is illustrated, where an input of 2 V is asserted on the $V_{IN}$ signal and remains asserted for a period of time, where it is understood that an actual DC voltage shift caused by the DTMF generator 103 would decay over time. Also, the DC step voltage asserted on the $V_{IN}$ signal will also be suddenly removed to illustrate response of the DC level shift control circuit 400 in response to a worst case scenario.

At time T0, there is no signal applied on the $V_{IN}$ signal so that all signals are essentially zero. A 2 V DC step voltage is applied at time T2 on the $V_{IN}$ signal, which immediately saturates the $G_{TX}$ amplifier 402, the A/D converter 118, the decimator 120, the GX amplifier 121, the LPF 404 and the GX amplifier 412, so that the $V_{TX}$, $V_S$, $V_{GX1}$, LPF and $V_{GX2}$ signals rise to 1 V. The ADJ signal is asserted high, turning on the FET 410 so that the quantizer 408 provides +0.2 V to the accumulator 416. The accumulator 416 responds almost immediately or within less than 1 ms at a time T4 and begins ramping up at 0.2 V increments, where each step is about 0.5 ms caused by the time delay 422. At a time T6, the $V_{DCADJ}$ signal reaches 1 V so that the overvoltage of the $V_{IN}$ signal is cancelled out by the adder 401. At this time, the $G_{TX}$ amplifier 402, the A/D converter 118 and the decimator 120 leave the saturation region. About 0.5 ms later at a time T8, the accumulator 416 drives the $V_{DCADJ}$ signal above 1 V so that the $V_{TX}$ signal begins ramping down by 0.2 V increments. Since the GX amplifier 121 has a gain of 6 dB and thus doubles its input voltage, it responds more slowly, but then quickly ramps down beginning at time T10. The LPF 404 responds fairly quickly to the output of the decimator 120 and begins ramping down at approximately time T8. The GX amplifier 412, also having a gain of 6 dB ramps down in response to the output of the LPF 404 until going to approximately 0.4 V at time T12.

Meanwhile, the accumulator 416 has ramped up to approximately 1.8 V, which is a 0.2 V differential with respect to the 2 V DC step signal asserted on the $V_{IN}$ signal. However, the 0.2 V is amplified to 0.4 V by the GX amplifier 412, which is below the threshold of the TH1 414 at time T12. Therefore, the ADJ signal goes low at approximately time T12, shutting off the FET 410 so that the accumulator 416 maintains the $V_{DCADJ}$ signal at approximately 1.8 V. The $V_{DCADJ}$ signal remains at 1.8 V to offset the 2 V step voltage asserted on the $V_{IN}$ signal. It is noted that the LLPF 426 responds much more slowly than the LPF 404 and thus climbs towards 0.2 V after the $V_S$ signal drops to 0.2 V.

Eventually at time T20, the 2 V step voltage applied on the $V_{IN}$ signal is suddenly removed so that now the opposite problem is presented by the $V_{DCADJ}$ signal causing a negative 1.8 V shift. Thus, the $G_{TX}$ amplifier 402, the A/D converter 118, the decimator 120, the GX amplifier 121, the LPF 404 and the GX amplifier 412 all saturate at −1 V at approximately time T20. The ADJ signal is asserted high in response to the GX amplifier 412 reaching its negative saturation point, thereby activating the FET 410 at time T20. Thus, the quantizer 408 provides a voltage of −0.2 V to the accumulator 416, which begins stepping downwards, thereby reducing the voltage of the $V_{DCADJ}$ signal beginning at time T22. Again, the accumulator 416 steps down in approximately 0.2 V steps, each occurring within approximately 0.5 ms. The $V_{DCADJ}$ signal eventually reaches one volt at time T24 and then drops below one volt 0.5 ms later at time T26, at which time the $V_{TX}$ and the output of the decimator 120 begin responding by rising above the −1 V saturation point. The LPF 404 begins ramping up at about time T26. The GX amplifiers 121, 412 respond more slowly at time T28, but eventually rise to −0.4 V at time T30, which is below the threshold level of the TH1 414. In this manner, the TH1 414 asserts the ADJ signal low, thereby turning off the FET 410, so that the output of the accumulator 416 remains at 0.2 V. Thus, the $V_{DCADJ}$ signal remains at 0.2 V.

Thus, the $V_{TX}$, $V_S$ and LPF signals remain at −0.2 V and the $V_{GX1}$ and $V_{GX2}$ signals remain at −0.4 V at time T30.

In the embodiment shown, the LLPF 426 has not yet reached 0.2 V at time T20. The LLPF 426 responds, albeit slowly, to the sudden drop of the $V_S$ signal at time T20 and begins to fall until eventually reaching 0 V at about time T32.

It is appreciated that the DC level shift control circuit 400 according to the present invention responds within 4 to 5 ms of a DC step voltage applied on the $V_{IN}$ signal pulling the primary components including the GX amplifier 121 out of saturation within 5 ms. In this manner, the line card 100 is capable of detecting the DTMF generator 103. In normal situations, the input step voltage or shift signal decays over time and the DC level shift control circuit 400 responds accordingly by reducing the $V_{DCADJ}$ signal back down to near zero or within 0.2 V.

It is noted that the output of the accumulator 416 has not decreased all the way to zero, but instead supplies a residue voltage such that the $V_{DCADJ}$ signal is at 0.2 V after the adjustment function is complete. This voltage residue is subtracted from $V_{IN}$ and then eventually multiplied by the GX amplifier 121 to −0.4 V if its gain is 6 dB, where this residual adjust voltage decreases the dynamic range of audio voice signals on the transmit path. The reset logic of the AND gate 434 prevents this undesirable situation. In particular, when the absolute value of the output of the adder junction 418 is greater than or equal to 0.2 V, the TH3 438 asserts its output high for a first reset condition. Also, when the output of the GX amplifier 412 is within half its maximum range such that the TH1 414 asserts its output low, the inverter 436 asserts its output high meeting a second reset condition. Finally, when the output of the LLPF 426 detecting residual DC adjust voltage is added to the output of the adder 418, and the absolute value of the difference is less than 0.2 V, the TH2 430 asserts its output low and the inverter 432 asserts its output high meeting the third and final reset condition, so that the AND gate 434 asserts the RESET signal high at about time T32. The switch 420 is switched to provide all zeros, and all zeros are provided from the FET 410, so that the output of the accumulator 416 is now at 0 V at a time T34, thereby resetting the DC level shift control circuit 400 according to the present invention. Thus, the $V_{GX1}$ signal is reset to 0 V at time T34, removing the voltage residue. Once the $V_{DCADJ}$ signal goes back to zero, the RESET signal goes low at about time T36. It is noted that the RESET pulse typically occurs much faster, but its width is emphasized for purposes of clarity.

It is now appreciated that DC level control according to the present invention allows the SLIC and SLAC devices of a telephone line card to operate normally even in situations involving a sudden DC jump caused by a DTMF generator impedance change. The invention as described herein keeps the devices of an electronic line card from saturating for significant periods of time, thereby allowing DTMF detection. The present invention provides a quantized and discontinuous solution so that the AC functions remain substantially unaffected, even at the very low frequency range. Thus, impedance matching and stability problems are avoided. Further, the components used to implement the present invention may be common, off the shelf and inexpensive components, resulting in a cost-effective solution.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A DC control circuit for cancelling DC voltage shifts occurring on the input signal of a telephone line card, the telephone line card including an AC input amplifier and a transmit path for detecting and converting the input signal to digital values, said DC control circuit comprising:
   a filter for receiving the transmit path digital values and for filtering and detecting DC voltage shifts of the digital values to provide a DC shift signal indicative thereof;
   an adjust circuit coupled to said low pass filter and receiving said DC shift signal for providing a quantized signal;
   an accumulator coupled to said adjust circuit and receiving said quantized signal for developing a DC adjust voltage; and
   an adder coupled to said accumulator and for coupling to the AC input amplifier for subtracting said DC adjust voltage from the input signal.

2. The DC control circuit of claim 1, wherein said filter is a low pass filter having a cutoff frequency of approximately 40 hertz.

3. The DC control circuit of claim 1, wherein the level of said quantized signal is based on the maximum voltage and gain of the transmit path of the telephone line card.

4. The DC control circuit of claim 1, wherein said quantized level is zero when said DC shift signal is below a predetermined threshold level.

5. The DC control circuit of claim 4, wherein said predetermined threshold level is equal to half the magnitude of the maximum voltage of the transmit path of the telephone line card.

6. The DC control circuit of claim 1, wherein the telephone line card includes a gain amplifier in the transmit path and wherein said adjust circuit comprises:
   a quantizer receiving said DC shift signal and asserting said quantized signal at predetermined quantization levels;
   a duplicate amplifier receiving said DC shift signal and having the same gain as the transmit amplifier of the telephone line card, said duplicate amplifier providing an amplified DC shift signal;
   a threshold circuit comparing said amplified DC shift signal to a predetermined threshold level and providing an adjust signal indicative thereof; and
   a switch circuit having an input receiving said quantized signal, a control terminal receiving said adjust signal and an output for providing said quantized signal while said amplified DC shift signal is equal to or greater than said predetermined threshold level.

7. The DC control circuit of claim 6, wherein said quantized signal is asserted at the same polarity as said DC shift signal and at a predetermined magnitude if the absolute value of said DC shift signal is greater than or equal to said predetermined magnitude, but otherwise said quantized signal is zero.

8. The DC control circuit of claim 1, wherein said accumulator comprises:
   an adder for adding said quantized signal to a delayed summation signal for providing a summation signal;
   a delay device receiving said summation signal from said adder for providing said delayed summation signal after a predetermined delay; and
   a digital to analog converter for converting said summation signal to said DC adjust signal.

9. The DC control circuit of claim 1, wherein said predetermined delay is 1 millisecond or less.

10. The DC control circuit of claim 1, further including a reset circuit coupled to said accumulator and receiving the transmit path digital values for resetting said accumulator, said reset circuit comprising:
    a long term filter for detecting a residual DC value on said digital values;
    a first threshold circuit for detecting whether said DC adjust voltage is zero and providing a zero signal indicative thereof;
    said adjust circuit providing an adjust signal indicative of whether said DC shift signal is above said predetermined threshold level;
    an adder coupled to said accumulator and said long term filter for combining said residual DC value with said DC adjust signal and providing a residual detect signal;
    a second threshold circuit for determining whether said residual detect signal is above a predetermined threshold level; and
    a switch circuit coupled to said first and second threshold circuits and said adjust circuit for resetting said accumulator output to zero.

11. The DC control circuit of claim 10, wherein said long term filter is a long term DC level predictor and a narrow band low pass filter.

12. The DC control circuit of claim 10, wherein said switch circuit comprises:
    a logic gate receiving said zero signal, said adjust signal and said residual detect signal for providing a reset signal; and
    a switch coupled to provide digital zero values to said accumulator when said reset signal is asserted, wherein said DC adjust voltage goes to zero.

13. A telephone line card for receiving an audio signal from a telephone, comprising:
    an input detection amplifier for separating the metallic component of the audio signal;
    an analog to digital converter for receiving and converting said analog metallic signal to a digital signal;
    a decimator for converting said digital signal to a decimated digital signal;
    a transmit path amplifier receiving and amplifying said decimated digital signal at a programmed gain;
    a low pass filter receiving said decimated digital signal for filtering and detecting DC voltage shifts for providing DC shift signals indicative thereof;
    an adjust circuit receiving said DC shift signal for providing a quantized signal;
    an accumulator receiving said quantized signal for developing a DC adjust voltage; and
    an adder coupled to said input detection amplifier, receiving said DC adjust voltage and for receiving the audio signal for subtracting said DC adjust voltage from the audio signal.

14. The telephone line card of claim 13, wherein said quantized signal is based on the maximum voltage and gain of said transmit path amplifier.

15. The telephone line card of claim 13, wherein said adjust circuit asserts said quantized signal at the same polarity as said DC shift signal and at a predetermined magnitude if the absolute value of said DC shift signal is greater than or equal to said predetermined magnitude, but otherwise asserts said quantized signal at zero.

16. The telephone line card of claim 13, wherein said adjust circuit comprises:
    a quantizer receiving said DC shift signal and asserting said quantized signal at predetermined quantization levels;

a duplicate amplifier receiving said DC shift signal and having the same programmed gain as said transmit path amplifier for providing an amplified DC shift signal;

a threshold circuit receiving and comparing said amplified DC shift signal to a predetermined threshold level and providing an adjust signal indicative thereof; and a switch circuit receiving said quantized signal and said adjust signal for providing said quantized signal to said accumulator while said adjust signal indicates said amplified DC shift signal is greater than or equal to said predetermined threshold level, but otherwise providing zero.

17. The telephone line card of claim 16, wherein said predetermined threshold level is equal to half the maximum output magnitude of said transmit path amplifier.

18. The telephone line card of claim 13, wherein said accumulator comprises:

an adder for adding said quantized signal to a delayed summation signal for providing a DC adjust signal; and a delay device for receiving said DC adjust signal and providing said delayed summation signal.

19. The telephone line card of claim 18, further comprising:

a digital to analog converter for converting said DC adjust signal to said DC adjust voltage.

20. The telephone line card of claim 13, further including a reset circuit receiving said decimated digital signal and providing a reset signal to reset said accumulator, said reset circuit comprising:

a long term DC level predictor filter receiving said decimated digital signal for providing a residual DC value;

a first threshold circuit for detecting whether said DC adjust voltage is zero and providing a zero signal indicative thereof;

said adjust circuit providing an adjust signal indicative of whether said DC shift signal is above said predetermined threshold level;

an adder coupled to said accumulator and said long term filter for adding said residual DC value to said DC adjust signal and providing a residual detect signal;

a second threshold circuit for determining whether said residual detect signal is above a second predetermined threshold level; and a switch circuit coupled to said first and second threshold circuits and said adjust circuit for resetting said accumulator output to zero.

21. The telephone line card of claim 20, wherein said switch circuit comprises:

a logic gate receiving said zero signal, said adjust signal and said residual detect signal for providing a reset signal; and a switch coupled to provide a zero value to said accumulator when said reset signal is asserted, wherein said DC adjust voltage goes to zero.

22. A telephone system, comprising:

a telephone including a DTMF generator, wherein said telephone asserts audio signals and dial tones from said DTMF generator onto a two-wire interface;

a telephone line card coupled to said two-wire interface for receiving said audio signals, said telephone line card comprising:

an input detection amplifier for separating the metallic component of the audio signal, and for providing an analog metallic signal, an analog to digital converter for receiving and converting said analog metallic signal to a digital signal;

a decimator for decimating said digital signal for providing a decimated digital signal;

a transmit path amplifier receiving and amplifying said decimated digital signal at a programmed gain;

a filter receiving said decimated digital signal for filtering and detecting DC voltage shifts for providing DC shift signals indicative thereof;

an adjust circuit receiving said DC shift signal for providing a quantized signal;

an accumulator receiving said quantized signal for developing a DC adjust voltage; and an adder coupled to said input detection amplifier, receiving said DC adjust voltage and for receiving the audio signal for subtracting said DC adjust voltage from the audio signal; and a compression unit coupled to said transmit path amplifier for converting amplified decimated digital signals to PCM codes; and a PCM highway coupled to said telephone line card for transmitting and receiving PCM codes.

23. The telephone system of claim 22, wherein said adjust circuit comprises:

a quantizer receiving said DC shift signal and asserting said quantized signal at a predetermined quantization level having the same polarity of said DC shift signal while the absolute value of said DC shift signal is greater than or equal to said predetermined quantization level, but otherwise asserting said quantized signal at zero;

a duplicate amplifier receiving said DC shift signal and having the same programmed gain as said transmit path amplifier for providing an amplified DC shift signal;

a threshold circuit receiving and comparing said amplified DC shift signal to a predetermined threshold level and providing an adjust signal indicative thereof; and a switch circuit receiving said quantized signal and said adjust signal for providing said quantized signal to said accumulator while said adjust signal indicates said amplified DC shift signal is greater than or equal to said predetermined threshold level, but otherwise providing zero.

24. The telephone system of claim 22, wherein said telephone line card includes a reset circuit receiving said decimated digital signal and providing a reset signal to reset said accumulator, said reset circuit comprising:

a long term filter receiving said decimated digital signal for providing a residual DC value;

a first threshold circuit for detecting whether said DC adjust voltage is zero and providing a zero signal indicative thereof;

said adjust circuit providing an adjust signal indicative of whether said DC shift signal is above said predetermined threshold level;

an adder coupled to said accumulator and said long term filter for combining said residual DC value with said DC adjust signal and providing a residual detect signal;

a second threshold circuit for determining whether said residual detect signal is above a second predetermined threshold level; and a switch circuit coupled to said first and second threshold circuits and said adjust circuit for resetting said accumulator output to zero.

\* \* \* \* \*